Oct. 21, 1924.

L. RAYMENT ET AL

RESILIENT WHEEL

Filed June 4, 1923

1,512,711

Inventors:
Lancelot Rayment
and Horace Gordon Futcher
By their Attorney

Patented Oct. 21, 1924.

1,512,711

UNITED STATES PATENT OFFICE.

LANCELOT RAYMENT, OF MELBOURNE, AND HORACE G. FUTCHER, OF FOOTSCRAY, NEAR MELBOURNE, VICTORIA, AUSTRALIA.

RESILIENT WHEEL.

Application filed June 4, 1923. Serial No. 643,335.

*To all whom it may concern:*

Be it known that we, LANCELOT RAYMENT, residing at Melbourne, in the State of Victoria, Commonwealth of Australia, and HORACE GORDON FUTCHER, residing at Footscray, near Melbourne, in the State of Victoria, Commonwealth of Australia, both subjects of the King of Great Britain, have invented new and useful Improvements in Resilient Wheels, of which the following is a specification.

This invention relates to an improved resilient wheel for motor-cars and similar vehicles, and it has been devised in order to provide a wheel of simple and durable construction having the required resiliency and capable of absorbing concussive shocks and other strains to which the wheels of motor vehicles are subjected under travelling conditions.

The improved resilient wheel comprises two sheet metal discs which are concaved or of dished formation and oppositely arranged on the wheel hub. These discs have circumferential flanges of semi-circular configuration providing a rim for a resilient tyre, that consists of a series of radially arranged blocks of rubber or other approved resilient material. Means are provided to lock the tyre blocks against creeping movement and in required relationship with each other. One of said metal discs is centrally apertured and maintained in slidable engagement with an inclined or curved surface fitted to the wheel hub, thereby permitting the distance between the inner central portions of said discs to be varied automatically within limitations. By this means, the wheel is momentarily distorted whilst absorbing concussive or like shocks, following which the tension created by the distortion of the wheel causes the discs to automatically resume their normal relative positions.

Reference is made to the accompanying drawings, wherein:—

The improved wheel comprises two concaved or dish-shaped discs 6 and 7 constructed of sheet metal and oppositely arranged. Each disc has a circumferential flange 8 of semicircular configuration and these flanges constitute the wheel rim wherein is fitted a tyre composed of a series of radially arranged blocks 9 of rubber or other approved resilient material. These resilient blocks are moulded with enlarged base portions $9^a$ so shaped as to be snugly accommodated by the wheel rim, and tread portions $9^b$ which project beyond the outer edge of said rim and are furnished with suitable road gripping surfaces.

Metal abutment discs 10 of circular shape are secured by welding within the rim, and function as stops to prevent creeping of the resilient blocks 9, and to maintain the same in desired relationship.

Figure 1:
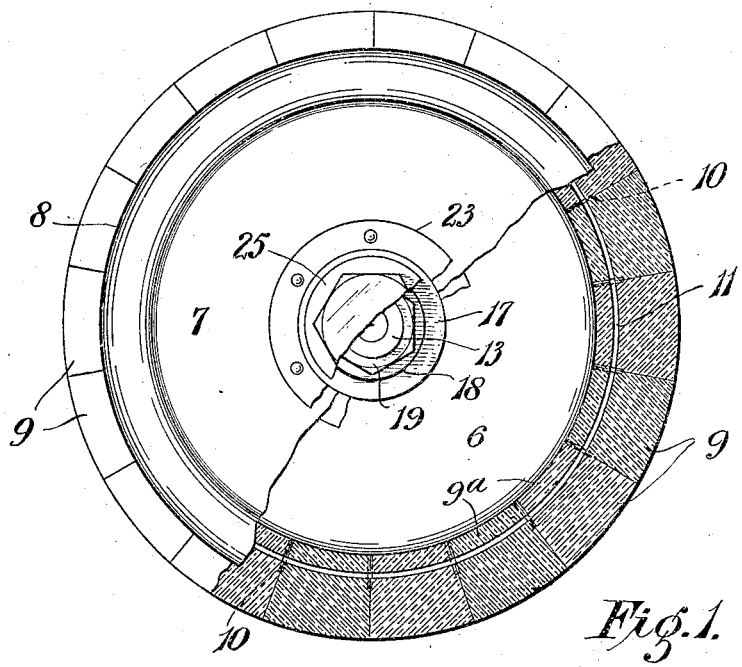
Figure 1 is a view in side elevation partly in section of the improved resilient wheel.
Figure 2:
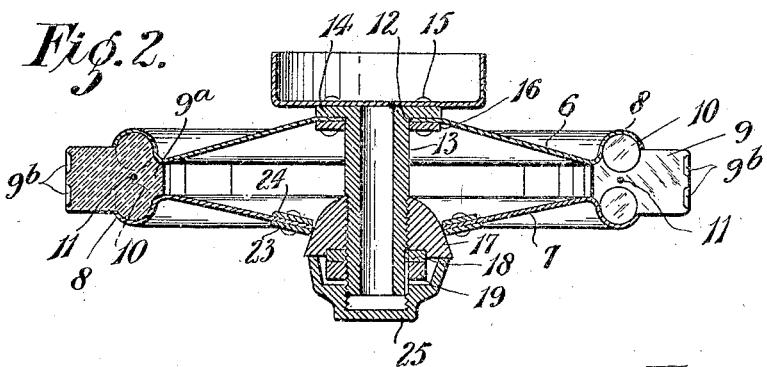
Figure 2 is a central, horizontal sectional view of Figure 1.
Figures 3, 4, 5:
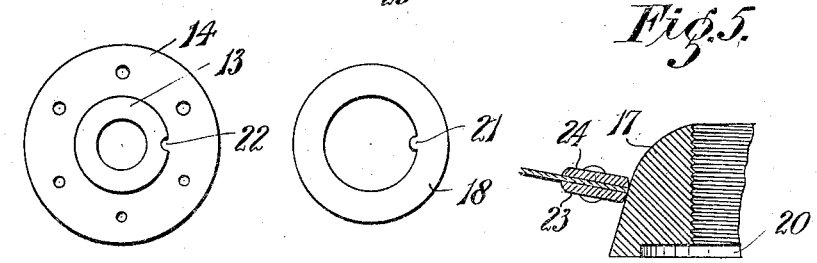
Figure 3 is a view in end elevation on an enlarged scale of the wheel hub.
Figure 4 is a view in side elevation of a locking washer.
Figure 5 is a sectional view of portion of a cone-shaped boss fitted on the hub, and the outer disc of the wheel that is in slidable engagement with said boss.

A hole is formed centrally through the base portion $9^a$ of each resilient block, whereby said blocks or tyre sections are threaded upon an annular metal wire 11, the ends of which are subsequently welded or otherwise fixedly secured together. This wire or band 11 is arranged within the wheel rim—see Figure 2—and binds together the tyre blocks or sections as a unit.

The inner metal disc 6 of the wheel is formed with a central orifice 12 whereby it is adapted to fit around the inner end portion of a metal hub 13 which is constructed with a flange 14 at its inner end, while its opposite end is screw-threaded. This disc is affixed to the wheel hub by means of rivets or bolts 15 that are passed through a clamp ring 16 on the inner side of said disc and through said hub flange 14.

The outer metal disc 7 of the wheel is also constructed with a central orifice, and it is fitted around a boss 17 of conical configuration, that is screw-threaded interiorly and screwed onto the threaded portion of the wheel hub 13. Said conical boss is locked in an adjusted position on the wheel hub by means of a washer 18 and a locknut 19.

A seating recess 20 for the washer 18 is formed in the outer face of the conical boss 17, and said washer is constructed with an inwardly projecting piece 21 which is engaged by a groove or recess 22 formed on the threaded portion of the hub. By tightening the lock-nut 19 against the washer 18, there is precluded the liability of accidental rotatable movement of said conical boss on the wheel hub 13.

Rigidly affixed to opposite sides of the outer metal disc 7 about the central orifice formed therein are rings 23 and 24 which slidably engage the curved surface of the conical-shaped boss 17, functioning as guides and also as reinforcing members for said disc.

When concussive shocks are transmitted to the wheel, as for example when passing over an obstacle or when travelling over an uneven roadway, the outer disc 7 of the wheel is permitted to have limited slidable movement when the guides 23 and 24 traverse the curved surface of the conical-shaped boss 17. When the wheel encounters an obstacle, or is otherwise subjected to a concussive shock, the outer disc 7 moves inwardly on the curved surface of said boss, causing a corresponding inward but momentary distortion of the inner disc 6. When the obstacle has been passed and the shock absorbed by the resilient wheel, the tension created by the momentary distortion of the disc 6 causes said discs to spring back to their normal positions.

A metal cap 25 of suitable design is secured to the outer end of the wheel hub 13 and prevents the ingress of dirt or other foreign matter to the axle of the wheel.

What we do claim is:

1. An improved resilient wheel characterized by having a hub furnished with a boss constructed with a curved or an inclined surface, two metal discs having rim members, and a resilient tyre rigidly accommodated by said rim members, one of said discs being rigidly secured to the hub, and the other of said discs having a central orifice fitting about said boss and permitting it to have slidable movement on said boss under shock conditions, substantially as described.

2. An improved resilient wheel characterized by having a hub furnished with a boss constructed with a curved or an inclined surface, two metal discs having rim members, and a resilient tyre rigidly accommodated by said rim members, one of said discs being rigidly secured to the hub, and the other of said discs having a central orifice fitting about said boss and permitting it to have slidable movement on said boss under shock conditions, and wherein the discs are concaved or of dished formation and arranged oppositely.

3. An improved resilient wheel characterized by having a hub furnished with a boss constructed with a curved or an inclined surface, two metal discs having rim members, and a resilient tyre rigidly accommodated by said rim members, one of said discs being rigidly secured to the hub, and the other of said discs having a central orifice fitting about said boss and permitting it to have slidable movement on said boss under shock conditions, and wherein the boss is affixed to the hub by screw-threading and is locked against rotatable movement thereon by a washer and a lock-nut, said washer having a projection adapted for engagement by a groove formed in the hub, substantially as described.

4. An improved resilient wheel characterized by having a hub furnished with a boss constructed with a curved or an inclined surface, two metal discs having rim members, and a resilient tyre rigidly accommodated by said rim members, one of said discs being rigidly secured to the hub, and the other of said discs having a central orifice fitting about said boss and permitting it to have slidable movement on said boss under shock conditions, and wherein a guide and reinforcing ring is affixed to the movable disc about the orifice formed centrally thereon, substantially as described.

5. An improved resilient wheel characterized by having a hub furnished with a boss constructed with a curved or an inclined surface, two metal discs having rim members, and a resilient tyre rigidly accommodated by said rim members, one of said discs being rigidly secured to the hub, and the other of said discs having a central orifice fitting about said boss and permitting it to have slidable movement on said boss under shock conditions, and wherein the boss is of conical configuration and has a screw-threaded engagement with one end of the hub, and a flange is formed on the opposite end of the hub to facilitate the rigid clamping thereto of one of the metal discs, substantially as described.

In testimony whereof we affix our signatures in presence of two witnesses.

LANCELOT RAYMENT.
HORACE G. FUTCHER.

Witnesses:
JAMES H. ANDERSON,
K. MULCAHY.